April 21, 1953     J. D. WALKER     2,635,758
CLARIFICATION APPARATUS
Filed July 11, 1950     2 SHEETS—SHEET 1
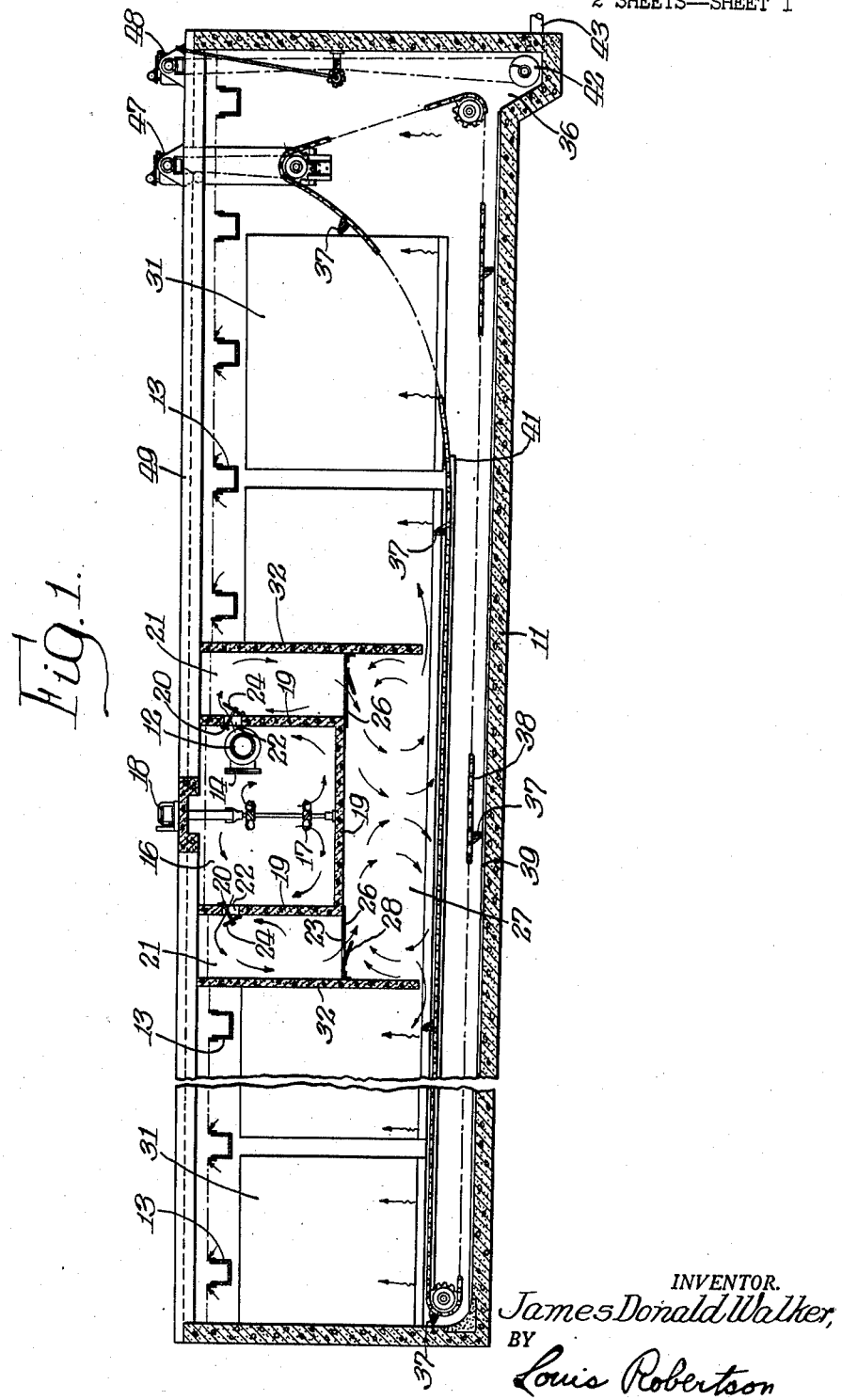
INVENTOR.
James Donald Walker,
BY
Louis Robertson
Atty.

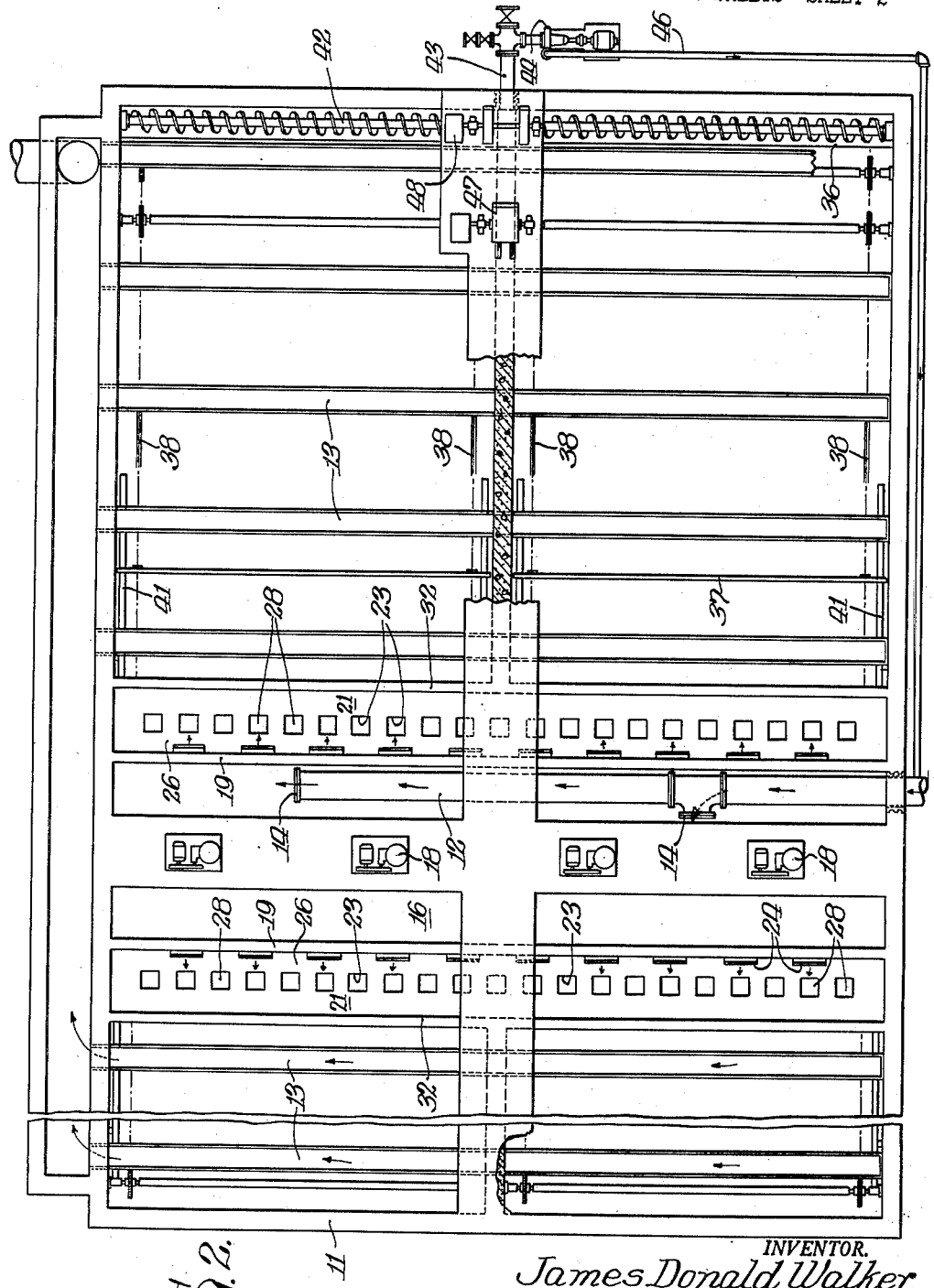

UNITED STATES PATENT OFFICE 2,635,758

CLARIFICATION APPARATUS

James Donald Walker, Aurora, Ill., assignor to Walker Process Equipment, Inc., Aurora, Ill., a corporation of Illinois Application July 11, 1950, Serial No. 173,107

3 Claims. (Cl. 210—55)

In water clarification tanks, water is flowed through a preliminary zone where it is mixed with chemicals or flocculated and is then flowed upwardly through a clarifying zone. The particles causing turbidity or the precipitates resulting from softening settle at the bottom of the tank and are removed.

Heretofore, the practice with such tanks has been to endeavor to minimize currents in the clarification chamber, even toward the bottom thereof. In the flocculating or accretion zone where eddy currents were desired, they were allowed to occur in a rather hit or miss fashion. According to the present invention, controlled circulating currents in the nature of uniform rolls are intentionally provided in such manner that they ensure good distribution of incoming water throughout the flocculation zone and the water leaving the flocculating zone likewise is well distributed throughout the bottom area of the clarification zone. In my co-pending application, Serial No. 150,034, principles underlying this invention were illustrated in connection with a circular tank. The form of the invention illustrated in the present application is a rectangular tank. This type of tank does not lend itself to producing a rolling action in the water about a vertical axis with the roll passing around the initial agitation zone. Nevertheless, many of the advantages obtainable by a controlled roll are obtained according to the present invention by constructing the apparatus so that a roll about a horizontal axis is imparted to the water.

Additional objects and advantages of the invention will be apparent from the following discussion and from the drawings.

Designation of figures

Figure 1 is a vertical sectional view, somewhat diagrammatic, through the form of the apparatus chosen for illustration, a portion thereof being broken away, and Figure 2 is a somewhat diagrammatic view, looking down on the apparatus of Figure 1, and with portions broken away.

Description

Although the law requires a full and exact description of at least one form of the invention, such as that which follows, it is, of course, the purpose of a patent to cover each new inventive concept therein, no matter how it may later be disguised by variations in form or additions of further improvements; and the appended claims are intended to accomplish this purpose by particularly pointing out the parts, improvements or combinations in which the inventive concepts are found.

The invention has been illustrated as used in a large rectangular tank 11 into which water flows through an inflow pipe 12 and from which the clarification water flows into launders 13. For economy, and maximum clarification efficiency, the water flows in both directions from the central section in which the inflow pipe 12 is located.

The inflow pipe 12 has one or more outlets 14, preferably provided with shear gates, located in an agitation chamber 16. In this chamber, the water is preferably under rather violent agitation as by the impellers 17 driven by power unit 18, which may include a motor and a variable speed drive. The agitation chamber 16 is formed by partitions 19 which extend entirely across the tank.

Agitation chamber 16 communicates with two reaction chambers 21 through a plurality of ports 22, spaced at reasonably close intervals along the length of the vertical walls 19. The reaction taking place in chambers 21 may be a physical reaction such as flocculation rather than a chemical reaction. In any event, it is desirable that a very definite and reasonably high speed roll be imparted to this water. This tends to ensure uniform distribution of the water passing through port 22 through the flocculation chambers 21 and prevents short-circuiting of water from a port 22 more or less directly to an outlet 23. The rolling motion of the water in chambers 21 is ensured by controlling the effective size of ports 22 so that the water flows outwardly from these ports at a fairly high speed. In short, the ports 22 must be sufficiently restricted to maintain an appreciably higher water level in agitation chamber 16 than in reaction chamber 21. A differential of two to three inches is desired.

This differential may be maintained by original design of the ports 22 or by providing deflectors 24 or gates which restrict the flow through the ports 22 and may guide the flow, if desired. However, when the ports are located as shown near the top of the chambers 21, a flow directly away from the ports 22 is desirable. Hence, not much guiding is required. Deflectors 24 are preferably adjustable and either have side wings or are wider than ports 22 to minimize flow transversely of the tank.

The outlet ports 23 are spaced at close intervals along the length of partitions 26, each of which extends the full width of the tank below one of the reaction chambers 21. It is desirable that the water flowing through ports 23 impart a decided roll to the water in distribution chamber 27, with the bottom of the roll moving outwardly lengthwise of the tank. Accordingly, the ports 23 are provided with deflectors 28 which may be adjustable and wider than ports 23. They are directed inwardly and restrict the ports 23 sufficiently to maintain an appreciable relative pressure differential between reaction chamber 21 and distribution chamber 27.

Reactions chambers 21 and the upper portion of distribution chamber 27 are separated from the clarification sections 31 which comprise most of the tank length by partitions 32 which extend entirely across the tank. However, the bottoms of these partitions are high enough above the floor of the tank so that distribution chamber 27 may be said to be in open communication with the clarification chambers 31. Accordingly, at a given level, the pressure is substantially the same in both chambers. The rolling motion of water in chamber 27 prevents short-circuiting of the water from ports 23 to chamber 31, which might result in rather heavy volumes of flow at localized points with poor distribution. At the same time, the water forming the bottom part of the roll in distribution chamber 27 tends to peel off by its momentum and flow lengthwise of the tank by its momentum a substantial distance into the clarification zones 31 to a point from which it may spread smoothly by gravity through the remainder of the clarification section 31. Flow upwardly through the clarification chambers 31 is maintained fairly uniformly throughout the cross section thereof by providing a relatively large number of launders 13 so that they can be spaced closely enough together to draw water from the entire cross section of the surface or upper portion of the body of water in clarification zones 31.

The flocs or other solids which settle from the water are pushed along the floor of the tank to a hopper 36 by slow-moving collector flights 37 carried by chains 38. The collector flights slide on imbedded rails 39 for their active run and may slide on guide rails 41 for their return or idle run. A cross conveyor 42 in hopper 36 moves the slurry or solids close to pipe 43 by which they may be withdrawn for disposal or recirculation. In the case of recirculation, a pump 44 (Fig. 2) may return the slurry through pipe 46 to agitation chamber 19 or to inflow pipe 12. Collector chains 38 may be driven by motor 47 and cross conveyor 42 may be driven by motor 48.

Motors 18, 47 and 48 may be carried by bridge 49.

The agitation in agitation chamber 19 is violent enough to ensure substantial uniformity of the water therein. The speeds of roll in chambers 21 and 27 are preferably high enough to preserve this uniformity by preventing channelling. A speed of .5 foot per second is believed to be sufficient. To provide at least this speed in distribution chamber 27 without so much as to risk stirring up the clarification chamber excessively, ports 23 occupy at least one-third of the width of the tank and are restricted enough to maintain a water level in chambers 21 about three-eights inch to one-half inch above that in clarification chamber 31. Higher speeds are harmless in chamber 21 and a water level there from two to three inches below the water level in the agitation chamber 16 is preferred. The best speed may depend somewhat on the nature of the particles within the water. For the purpose of ensuring uniformity, a speed sufficient to prevent perceptible de-entrainment of the solids within the roll is desired. By this is not meant to prevent a few especially heavy solids from settling but rather to prevent an appreciable variation in the character of the water. Preferably the deflectors 26 are adjusted so that with the ordinary rate of flow the ports 24 are restricted just enough so that there is no visible partial clarification of any of the water in the roll.

Another factor which tends toward uniformity of the character of the water throughout the roll is that the roll does not pass through any light solids freshly settled from the clarification chamber. Of course the roll may include solids recirculated through the pipe 51 but these are thoroughly mixed with the water in the agitation chamber 13 before they pass to the roll. The movement of the water in agitation chamber 13 preferably includes noticeable heterogeneous eddy currents and in fact need not include any definite roll.

From the foregoing, it is seen that a very efficient water-clarifying apparatus and method have been provided, the efficiency being accomplished mainly by controlled currents which ensure complete distribution of the water through the desired areas.

This apparatus and method can be used for activated sludge treatment of wastes and other such treatments, the term "water clarification" being used broadly.

I claim:

1. Water-clarifying apparatus including a tank, partial partition means across the tank forming a clarification chamber on one side of the partial partition and a distribution chamber on the other side in free and open communication with the lower portion of the clarification chamber, inflow means for flowing water to be treated to a plurality of points spaced transversely along transversely of the tank in said distribution chamber and directed at all of said points in a somewhat tangential direction about an axis extending transversely of the tank, and means for drawing off water from the clarification chamber, said inflow means being constricted for imparting enough speed to the inflowing water at said points for moving the water within the distribution chamber predominantly with an over-all uniform and homogeneous roll about said axis with a velocity at least .5 ft. per second and sufficient to prevent perceptible detraining of the solids, said distributing chamber being substantially free from obstructions impeding said roll and having an over-all dimension perpendicular to said axis smaller than the like dimension of the clarification chamber, and said clarification chamber being beyond said distribution chamber from said axis whereby the water flows by combined gravity and momentum from the peripheral portion of the roll away from the axis in passing to the clarification chamber and along the lower portion thereof.

2. Water-clarifying apparatus including a tank, partial partition means across the tank forming a clarification chamber on one side of the partial partition and a distribution chamber on the other side in free and open communication with the lower portion of the clarification chamber, inflow means for flowing water to be treated to a plurality of points spaced transversely along transversely of the tank in said distribution chamber and directed at all of said points in a somewhat tangential direction about an axis extending transversely of the tank, and means for drawing off water from the clarification chamber, said inflow means being constricted for imparting enough speed to the inflowing water at said points for moving the water within the distribution chamber predominantly with an over-all uniform and homogeneous roll about said axis with a velocity at least .5 ft. per second and sufficient to prevent perceptible detraining of the solids, said distributing chamber being substantially free from obstructions impeding said roll and having an over-all dimension perpendicular to said axis smaller than the like dimension of the clarification chamber, and said clarification chamber being beyond said distribution chamber from said axis whereby the water flows by combined gravity and momentum from the peripheral portion of the roll away from the axis in passing to the clarification chamber and along the lower portion thereof, said inflow means including an entry chamber extending transversely of the tank and an intermediate chamber extending transversely of the tank and communicating with the distribution chamber at said evenly-spaced points and with the entry chamber at evenly spaced points through means directing the water flowing from the entry chamber to the intermediate chamber generally tangentially about an axis and constricted to produce an over-all uniform and homogeneous roll in said intermediate chamber about said axis with a velocity at least .5 ft. per second and sufficient to prevent perceptible detraining of the solids, to prevent non-uniform channelling through the intermediate chamber.

3. Water-clarifying apparatus including a tank, partial partition means across the tank forming a clarification chamber on one side of the partial partition and a distribution chamber on the other side in free and open communication with the lower portion of the clarification chamber, inflow means for flowing water to be treated to a plurality of points spaced transversely along transversely of the tank in said distribution chamber and directed at all of said points in a somewhat tangential direction about an axis extending transversely of the tank, means for drawing off water from the clarification chamber, said inflow means being constricted for imparting enough speed to the inflowing water at said points for moving the water within the distribution chamber predominantly with an over-all uniform and homogeneous roll about said axis with a velocity at least .5 ft. per second and sufficient to prevent perceptible detraining of the solids, said distributing chamber being substantially free from obstructions impeding said roll and having an over-all dimension perpendicular to said axis smaller than the like dimension of the clarification chamber, and said clarification chamber being beyond said distribution chamber from said axis whereby the water flows by combined gravity and momentum from the peripheral portion of the roll away from the axis in passing to the clarification chamber and along the lower portion thereof, said inflow means including an entry chamber extending transversely of the tank and an intermediate chamber extending transversely of the tank and communicating with the distribution chamber at said evenly-spaced points and with the entry chamber at evenly-spaced points through means directing the water flowing from the entry chamber to the intermediate chamber generally tangentially about an axis and constricted to produce an over-all uniform and homogeneous roll in said intermediate chamber about said axis with a velocity at least .5 ft. per second and sufficient to prevent perceptible detraining of the solids, to prevent non-uniform channelling through the intermediate chamber, and agitating means in the entry chamber to ensure uniformity of the water flowing to the various parts of the intermediate chamber.

JAMES DONALD WALKER.

References Cited in the file of this patent

UNITED STATES PATENTS

| Number | Name | Date |
|---|---|---|
| 691,091 | Aberg | Jan. 14, 1902 |
| 839,396 | Kremer | Dec. 25, 1906 |
| 1,603,625 | Mitchell | Oct. 19, 1926 |
| 2,061,841 | Lang | Nov. 24, 1936 |
| 2,217,143 | Stevenson | Oct. 8, 1940 |
| 2,318,436 | Tark | May 4, 1943 |
| 2,320,512 | Daily | June 1, 1943 |
| 2,420,927 | Anderson | May 20, 1947 |
| 2,509,683 | Green | May 30, 1950 |
| 2,509,933 | Lind | May 30, 1950 |
| 2,517,883 | Kennedy | Aug. 8, 1950 |
| 2,573,941 | Walker et al. | Nov. 6, 1951 |

FOREIGN PATENTS

| Number | Country | Date |
|---|---|---|
| 15,783 | Great Britain | A. D. 1895 |

OTHER REFERENCES

Rady: "Report on Georgetown, Texas, Accelerator Water Softening Plant," page 3, reprint from Southwest Water Works Journal, 1939.